UNITED STATES PATENT OFFICE 2,430,295

METHINE DYESTUFFS

John David Kendall, Ilford, England, assignor to Ilford Limited, Ilford, England, a British company No Drawing. Application November 15, 1937, Serial No. 174,693. In Great Britain November 14, 1936

14 Claims. (Cl. 260—240)

(Granted under the provisions of sec. 14, act of March 2, 1927; 357 O. G. 5)

This invention relates to the manufacture of dyestuffs and more particularly to dyestuffs comprising a number of heterocyclic nuclei linked together by methine or substituted methine groups or nitrogen atoms or chains of methine groups which may or may not include nitrogen atoms.

In my co-pending application Serial No. 174,489, filed November 13, 1937, a process is described for the preparation of dyestuffs by condensing a quaternary salt of a heterocyclic nitrogen compound having a reactive methyl group in the presence of an anhydride of a monobasic organic acid and an acid binding agent, with a 5-membered heterocyclic ring compound which may be represented by the general formula:

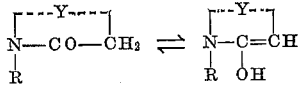

(where R=hydrogen, alkyl, aryl or aralkyl and Y is the remainder of a 5-membered ring) to yield compounds of the type A believed to have the formula:

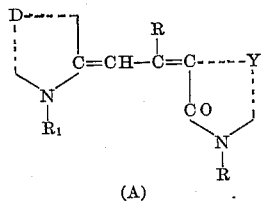

(where D is the remainder of a heterocyclic system, Y and R are as before and $R_1$=an alkyl group) or of the type $A_1$

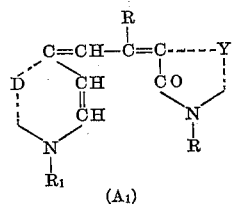

when the quaternary salt of a methyl compound of the pyridine or quinoline series, e. g., lepidine, is employed in the condensation.

It has now been found that when in the above reaction the 5-membered ring compound employed contains the system:

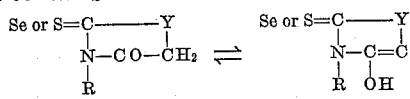

e. g., when rhodanic acids are employed, the resulting dyestuff A can be treated with an alkyl salt, $R_1X$ (where $R_1$ is an alkyl group and X is an acid radical), and the compound B

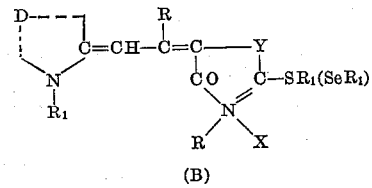

so produced can then be reacted with a large number of compounds having reactive groups as have already been employed in the manufacture of cyanine dyestuffs or intermediate products for use in preparing cyanine dyestuffs.

Such compounds containing the reactive groups may be heterocyclic nitrogen compounds having a reactive methyl or external methylene group or a reactive amino or imino grouping in the α or γ position; 5-membered ring compounds containing the system:

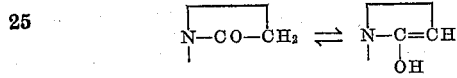

carbocyclic compounds containing a reactive cyclomethylene group such as cyclopentadiene and its homologues, e. g., indene; carbocyclic compounds containing a keto methylene group such as indane-dione, thioindoxyls and coumaranones; or condensing agents, e. g., acids or esters of the type:

(where X=hydrogen or a monovalent substituent, R=hydrogen or an alkyl or similar group, and n=0 or 1) such as malonic and glutaconic acid or esters; anhydrides of acids of the general formula:

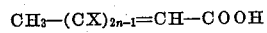

(where X represents hydrogen or a monovalent grouping and n is 1 or 2) such as crotonic or substituted crotonic anhydrides; or ammonia or amidines, or hydrazines, or diamines e. g. p-phenylene diamine.

In the case of the condensing agents such as malonic acid, glutaconic acid, and of cyclopentadiene, indenes, amines, ammonia or hydrazine, two molecules of the intermediate compound B may be condensed with the condensing agent.

The invention accordingly comprises a method of preparing dyestuffs containing a number of heterocyclic nitrogen rings linked together by methine or substituted methine groups or nitrogen atoms or by chains of methine groups and nitrogen atoms, comprising first condensing, in the presence of an anhydride of a monobasic organic acid and an acid binding agent, a quaternary salt of a heterocyclic nitrogen compound having a reactive methyl group in the α or γ position with a 5-membered heterocyclic nitrogen compound containing the system:

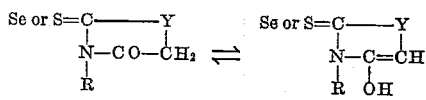

to form a dyestuff, reacting the dyestuff with an alkyl salt to form an intermediate compound, and further condensing the said intermediate compound with a heterocyclic nitrogen compound having any of the reactive groupings described above or with any of the condensing agents described above.

According to a further feature of the invention a dyestuff of the type A obtained in the first reaction described above, when prepared by any process may be treated with the alkyl salt to form an intermediate compound of the type B which may then be reacted with a heterocyclic compound containing any of the reactive groupings described above or with any of the condensing agents described above.

Examples of the 5-membered heterocyclic nitrogen compounds containing the grouping:

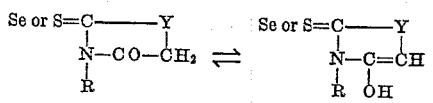

are N-alkyl, N-aryl or N-aralkyl substituted derivatives of rhodanic acid, 2-seleno-4-keto-tetrahydro-thiazole, 2-thio (or seleno)-4-ketotetrahydro-oxazole, or 2-thio (or seleno)-4-ketotetrahydroselenazole.

Examples of heterocyclic nitrogen compounds which may be employed either in the first condensation stage or in the final condensation stage may be any of those azoles, azines, diazoles and diazines commonly employed in the preparation of cyanine dyestuffs, for example, pyridine and its polycyclic homologues, e. g., quinoline and naphthaquinolines; thiazoles, oxazoles and selenazoles and their polycyclic derivatives, e. g., those of the benzene and naphthalene series; indolenines, oxazolines, thiazolines and selenoazolines; pyrimidine and quinazoline; thio-ββ'-diazole; and the nuclear substituted derivatives of the above compounds including hydroxy, alkoxy, methylene, dioxy, amino and similar substituted derivatives having the appropriate reactive groupings.

Examples of the compound containing the grouping:

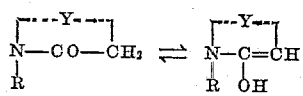

which may also be reacted with the intermediate compound of type B, are rhodanic acids, and similar compounds as described in the specification of prior British Patent No. 426,718.

The reaction is believed to take the following course, taking as an example 1-methylbenzthiazole ethiodide and N-methyl-rhodanic acid: The first condensation stage is the formation of the dyestuff I which may be represented by the following equation:

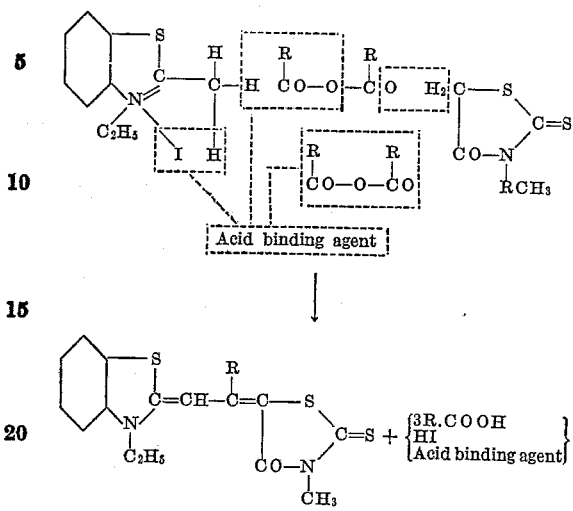

The compound I is then reacted with an alkyl salt, for example, methyl-p-toluene sulphonate, to give a compound II as follows:

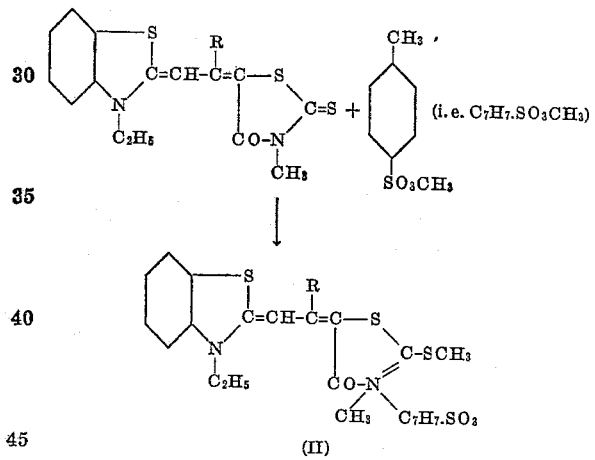

Taking the condensation of this compound II with a 1-methylbenzthiazole ethyl-p-toluene sulphonate as an example, the second condensation reaction is believed to take place as follows to give the product III:

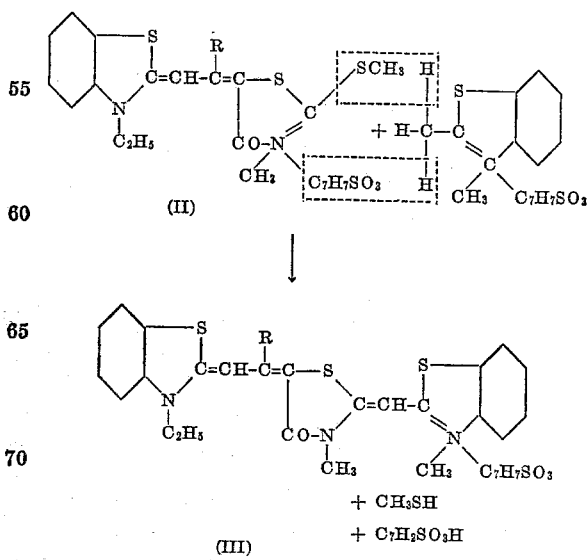

In an alternative case the intermediate compound II is condensed with a condensing agent, for example malonic acid, in the presence of pyridine, and in this case the reaction is believed to take place as follows, resulting in the formation of dyestuff IV:

In carrying out the reaction according to the invention the first stage follows exactly as described in copending application Serial No. 174,489, filed November 13, 1937, and the product of the type A or A₁ produced thereby is then treated with an alkyl salt and converted to the intermediate compound of type B which is then reacted with the compound containing the other reactive grouping by boiling in the presence of a solvent and an acid binding agent (a compound such as pyridine which acts both as the solvent and acid binding agent may be employed).

Alternatively a compound of type A or A₁, an alkyl salt and a heterocyclic nitrogen base containing a reactive grouping may be fused together and the reaction completed if necessary by further boiling in the presence of a solvent and an acid binding agent or a compound such as pyridine which is both a solvent and acid binding agent. In the above reactions in place of the

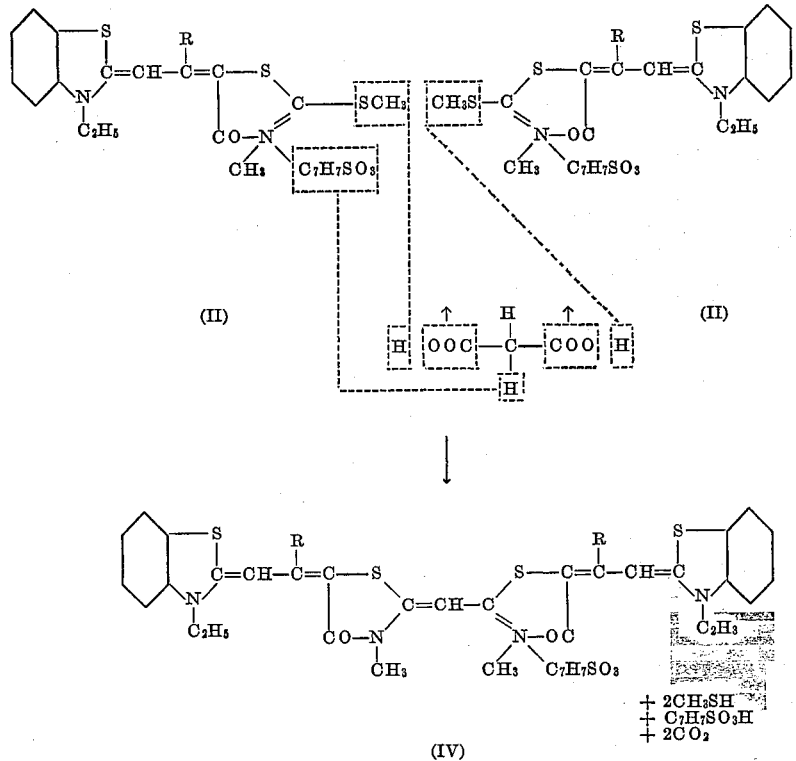

In a further alternative, in certain cases where the intermediate compound II is condensed with a compound such as cyclo-pentadiene containing a system of the type:

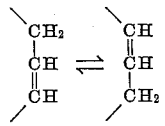

which on condensing with the reactive grouping gives rise to a further reactive group of similar type, the reaction is believed to take the following course (represented in one stage) resulting in the formation of a dyestuff V.

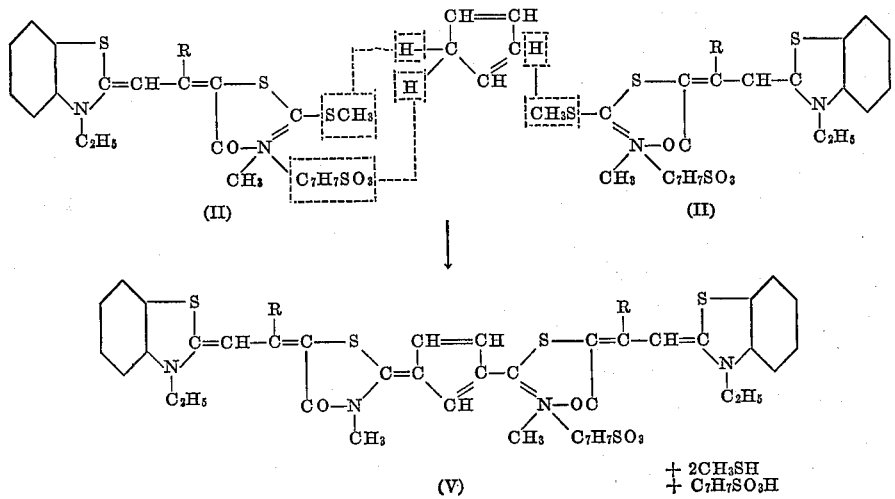

pyridine, alcohol may be used as a solvent and the acid binding agent may be sodium acetate or sodium alcoholate or an organic base, for example, such as piperidine or triethanolamine.

Many of the products of the present invention act as sensitisers for photographic silver halide emulsions.

The process of the present invention is illustrated by the following examples which are given by way of example only.

Example I (1a) 13.2 grams of 1-methylbenzthiazole and 16.5 grams of methyl-p-toluene sulphonate were fused together for 2½ hours at 130–140° C. 90 ccs. of pyridine, 15 ccs. of acetic anhydride and 13.0 grams of N-methyl-rhodanic acid were added. The mixture was then heated gently for fifteen minutes to dissolve the solid and then gently boiled for 25 minutes under a reflux condenser. The resulting mixture was then poured into 30 ccs. of alcohol when the dyestuff precipitated out and was collected and washed and recrystallised.

(1b) 0.5 gram of this dyestuff, and 0.3 gram of 1-methylbenzthiazole were mixed with 5 grams of ethyl-p-toluene sulphonate and fused together for 3 hours at 140–160° C. 20 ccs. of pyridine were then added and the mixture was gently warmed for about five minutes and then boiled under a reflux condenser for twenty-five minutes. It was then poured into a solution of 5 grams of potassium bromide when a dyestuff separated out. This dye was collected, well washed with alcohol, hot benzene and ether and purified by boiling out with methyl alcohol in which the dyestuff itself was sparingly soluble. The product was obtained as bronze crystals, melting at 293° C. with decomposition.

The dyestuff, which gives a blue alcoholic solution, is a sensitizer for photographic emulsions and extends the sensitivity of a silver iodo-bromide emulsion to about λ7000 Å. with maxima at about λ5800 Å. and λ6400 Å.

The above Examples 1a and 1b are given as representative of the general methods adopted for the preparation of a large number of other compounds using various starting materials but similar quantities, temperatures, times of heating and general technique, and these methods are referred to as "method 1a" and "method 1b" in the following examples in order to avoid repetition of such details.

The condensation product produced according to method 1a from 1-methylbenzoxazole methiodide, N-methyl rhodanic acid and acetic anhydride was reacted according to method 1b with 1-methylbenzthiazole and methyl-p-toluene sulphonate to yield purple brown crystals melting at 284° C. This dye is a sensitizer for photographic silver halide emulsions and extends the sensitivity of a silver iodo-bromide emulsion to about λ6600 Å. with maxima at about λ5800 Å. and λ4700 Å.

Another batch of the same condensation product was reacted according to method 1b with 1-methylbenzthiazole and ethyl-p-toluene sulphonate to yield purple-grey matted crystals melting at 297° C. This dye is a sensitizer for silver halide photographic emulsions and extends the sensitivity of a silver iodo-bromide emulsion to about λ6500 Å. with maxima at about λ6050 Å., λ5700 Å. and λ4700 Å.

The condensation product produced according to method 1a from quinaldine, N-methyl rhodanic acid and acetic anhydride was reacted according to method 1b with methyl-p-toluene sulphonate and methylbenzthiazole to yield small dark blue crystals, melting at 284° C. This dye is a sensitizer for silver halide photographic emulsions and extends the sensitivity of a silver iodo-bromide emulsion to about λ7300 Å. with maxima at about λ6850 Å., λ6100 Å., λ5750 Å. and λ4700 Å.

Another batch of the same condensation product was reacted according to method 1b with 1-methylbenzthiazole and ethyl-p-toluene sulphonate to yield green matted crystals melting at 298° C. This dye is a sensitizer for photographic silver halide emulsions and extends the sensitivity of a silver iodo-bromide emulsion to about λ6600 Å. with maxima at about λ6100 Å., λ5980 Å. and λ4900 Å., with a minimum at about λ5300 Å.

The condensation product produced according to method 1a from 2.3.3-trimethyl indolenine methiodide, N-methyl-rhodanic acid and acetic anhydride was reacted according to method 1b with methylbenzthiazole and methyl-p-toluene sulphonate to yield dark golden brown crystals melting at 267° C. This dyestuff is a sensitizer for photographic silver halide emulsions and extends the sensitivity of a silver iodo-bromide emulsion to about λ6300 Å.

The condensation product produced according to method 1a from lepidine, methyl-p-toluene sulphonate, N-methyl-rhodanic acid and acetic anhydride was reacted according to method 1b with 1-methylbenzthiazole and methyl-p-toluene sulphonate to yield dark brown solid, melting at 267° C., giving blue solution.

The condensation product produced according to method 1a from methyl-benzthiazole, methyl-p-toluene sulphonate and N-methyl-2-thio-4-keto-tetrahydro oxazole and acetic anhydride was reacted according to method 1b with 1-methylbenzthiazole and ethyl-p-toluene sulphonate to yield a mauve powder melting at 260° C.

The condensation product produced according to method 1a from 1-methylbenzthiazole, methyl-p-toluene sulphonate, N-ethyl-2-thio-4-keto-tetrahydro oxazole and acetic anhydride, was reacted according to method 1b with methyl-benzthiazole and ethyl-p-toluene sulphonate to yield mauve matted needles, melting at 235° C. This dyestuff is a powerful sensitizer for photographic silver halide emulsions and extends the sensitivity of a silver iodo-bromide emulsion to about λ6500 Å. with indeterminate maxima at about λ5300 Å. and λ5900 Å.

The condensation product produced according to method 1a from 1-methylbenzthiazole, methyl-p-toluene sulphonate, N-ethyl-rhodanic acid and acetic anhydride, was reacted according to method 1b with 1-methylbenzthiazole, and ethyl-p-toluene sulphonate to yield bright green matted needles, melting at 283° C. This dyestuff is a strong sensitizer for photographic silver halide emulsions and extends the sensitivity of a silver iodo-bromide emulsion to about λ7000 Å. with indeterminate maxima at about λ6400 Å. and λ5400 Å. and λ4950 Å. with a slight minimum at about λ5050 Å.

Another batch of the same condensation product was reacted according to method 1b with 1-methylbenzthiazole and methyl-p-toluene sulphonate to yield bright green matted needles, melting at 290° C. This dyestuff is a sensitizer for photographic silver halide emulsions and extends the sensitivity of a silver iodo-bromide emulsion to about λ7000 Å., with an indeterminate maximum at about λ6000 A. and a maximum at λ4700 A. and a slight minimum at about λ5100 A.

The condensation product produced according to method 1a from 1-methylbenzthiazole, methyl-p-toluene sulphonate, N-ethylrhodanic acid, and acetic anhydride was reacted according to method 1b with methylbenzthiazole and ethyl-p-toluene sulphonate to yield a dark blue powder melting at 222° C. with decomposition.

The condensation product prepared according to method 1a from quinaldine, methyl-p-toluene sulphonate, N-ethylrhodanic acid and acetic anhydride was reacted according to method 1b with 1-methylbenzthiazole and ethyl-p-toluene sulphonate to yield dark green matted crystals, melting at 294° C. with decomposition. This dyestuff is a sensitizer for photographic silver halide emulsions and extends the sensitivity of a silver iodo-bromide emulsion to about λ6900 A. with an indeterminate maximum at about λ6000 A. and a maximum λ4700 A. and a minimum at about λ5200 A.

The condensation product produced according to method 1a from 1-methylbenzthiazole, ethyl-p-toluene sulphonate, N-ethylrhodanic acid and acetic anhydride was reacted according to method 1b with 1-methylbenzthiazole and ethyl-p-toluene sulphonate to yield blue-green matted crystals melting at 299° C. with decomposition. This dyestuff is a sensitizer for photographic silver halide emulsions and extends the sensitivity of a silver iodo-bromide emulsion to about λ6900 A. with slight maxima at about λ4700 A., λ5700 A. and λ6500 A. and a minimum at about λ5100 A.

The condensation product produced according to method 1a from 1-methylbenzthiazole, methyl-p-toluene sulphonate, acetic anhydride and N-methyl-rhodanic acid was reacted as follows:

(1c) The technique adopted in this method is similar to that of method 1b. 7.3 grams of the condensation product were fused together with 3.3 grams of 1-methylbenzoxazole and 40 grams of ethyl-p-toluene sulphonate for four hours at 140° C. The mixture was then allowed to cool and 15 ccs. of pyridine were added, and the whole gently boiled under a reflux condenser for about thirty minutes. The mixture was then poured into a warm solution of potassium bromide and diluted with water to 150 ccs. The dye separated out and was filtered off and boiled out repeatedly with benzene. The residue recrystallised from methyl alcohol as dark green crystals melting at 294° C.

The condensation product produced according to method 1a from 1-methylbenzoxazole methiodide, N-methyl rhodanic acid and acetic anhydride was reacted according to method 1c with methylbenzoxazole and ethyl-p-toluene sulphonate to yield a reddish-brown powder, melting at over 310° C. This dyestuff is a sensitizer for photographic silver halide emulsions and extends the sensitivity of a silver iodo-bromide emulsion to about λ6300 A. with a slight maximum at about λ5900 A. and a stronger maximum at about λ4700 A.

The condensation product produced according to method 1a from quinaldine, methyl-p-toluene sulphonate, N-methyl rhodanic acid and acetic anhydride, was reacted according to the method 1c with 1-methylbenzoxazole and ethyl-p-toluene sulphonate to yield dark green crystals, melting at 245° C. and giving a blue solution in alcohol.

The condensation product produced according to method 1a from 1-methylbenzthiazole, methyl-p-toluene sulphonate, N-ethyl rhodanic acid and acetic anhydride was reacted according to method 1c with 1-methylbenzoxazole and ethyl-p-toluene sulphonate to yield blue crystals, melting at 287° C. This dyestuff is a strong sensitizer for photographic silver halide emulsions and extends the sensitivity of a silver iodo-bromide emulsion to about λ6700 A. with indeterminate maxima at about λ5600 A. and λ6200 A. and a stronger maximum at about λ4700 A. and a minimum at about λ5000 A.

The condensation product produced according to method 1a from 1-methylbenzthiazole, methyl-p-toluene sulphonate, acetic anhydride and N-methyl rhodanic acid was reacted as follows:

(1d) The technique adopted in this method is similar to that of methods 1b and 1c. 7.3 grams of the condensation product were fused with 3.6 grams of quinaldine and 30 grams of ethyl-p-toluene sulphonate for 4 hours at 140–150° C. The mixture was then allowed to cool and 150 ccs. of pyridine were added and the whole gently boiled under a reflux condenser for half an hour. The mixture was then poured into a solution of potassium bromide and the precipitate which separated out was filtered off, washed with water, alcohol and hot benzene and alcohol again and was then boiled out with benzene to remove benzene-soluble impurities. The residue was recrystallised from methyl alcohol as small gold crystals, melting at 280° C. with decomposition. This dyestuff is a sensitizer for photographic silver halide emulsions and extends the sensitivity of a silver iodo-bromide emulsion to about λ5100 A. with a maximum at about λ4700 A.

The condensation product produced according to method 1a from methylbenzthiazole, ethyl-p-toluene sulphonate, N-ethyl-rhodanic acid and acetic anhydride was reacted according to method 1d with quinaldine and ethyl-p-toluene sulphonate to yield dark blue matted crystals melting at 271° C.

The condensation product produced according to method 1a from 1-methylbenzthiazole, methyl-p-toluene sulphonate, acetic anhydride and N-methyl-rhodanic acid was reacted as follows:

(1e) The technique adopted in this method is similar to that of methods 1b, 1c and 1d. 0.50 gram of the condensation product were fused together with 0.28 gram of lepidine and 5.0 grams of ethyl-p-toluene sulphonate for three hours at 130–140° C. when the mixture became deep green in colour. After allowing the mixture to cool, 20 ccs. of pyridine were added and the mixture was gently warmed for a few minutes to effect solution and was then gently boiled under a reflux condenser for about twenty minutes. A small amount of solid was formed which was filtered off, and the filtrate treated with excess potassium iodide solution. A dyestuff was precipitated out and was filtered off and washed and purified by boiling out with methyl alcohol, leaving crystals melting at 292° C. with decomposition.

The dyestuff, which gives a blue-green solution in alcohol, is a sensitiser for photographic emulsions and sensitizes a silver iodo-bromide emulsion over the range from about λ6200 A. to λ7880 A. with a maximum at about λ7150 A.

*Example II*

0.50 gm. of the product obtained by condensing 1-methylbenzthiazole ethiodide and N-methyl-rhodanic acid according to method 1a and 3.0 gms. of methyl-p-toluene sulphonate were fused together for three hours at 140–160° C. After allowing the mixture to cool, 1 gm. of malonic acid and 15 ccs. of pyridine were added and the mixture was gently warmed for about twenty minutes.

The mixture was then allowed to cool when the dye was precipitated as dark bronze crystals. The crystals were filtered off and washed with alcohol and hot benzene and purified by boiling out with methyl alcohol. The purified crystals melted at 284° C. with decomposition.

The dyestuff produced is soluble in alcohol to give a green solution and is a sensitiser for photographic emulsions, it sensitises a silver-iodobromide emulsion over a range from about λ6600 Å. to λ8000 Å. with a maximum at about λ7600 Å.

A similar product was obtained by the above method using malonic acid and the condensation product obtained according to method 1a from quinaldine, methyl-p-toluene sulphonate, N-methyl rhodanic acid and acetic anhydride, as golden crystals melting at 257° C. with decomposition.

A similar product was obtained by the above method using malonic acid and the condensation product obtained according to method 1a from 1-methylbenzthiazole-p-toluene sulphonate, N-ethyl rhodanic acid and acetic anhydride, as a dark brown powder melting at 266° C. with decomposition.

A similar product was obtained by the above method using malonic acid and the condensation product obtained according to method 1a from 1-methylbenzthiazole, methyl-p-toluene sulphonate, acetic anhydride and N-ethyl rhodanic acid, as a dark blue powder melting at 223° C. and giving a blue green solution in alcohol.

A similar product was obtained by the same method from glutaconic acid and the condensation product obtained according to method 1a from quinaldine, methyl-p-toluene sulphonate, acetic anhydride and N-methyl rhodanic acid.

A similar product was obtained by the same method from glutaconic acid and the condensation product obtained according to method 1a from 1-methylbenzthiazole methiodide, N-methyl rhodanic acid and acetic anhydride, as dark golden brown needles melting at 271° C. with decomposition.

A similar product was obtained by the above method from glutaconic acid and the condensation product obtained according to method 1a from 1-methylbenzthiazole, methyl-p-toluene sulphonate, acetic anhydride and N-ethyl rhodanic acid, as a dark blue green substance melting at 265° C. with decomposition.

A similar compound was obtained by the same method from glutaconic acid and the condensation product obtained according to method 1a from 1-methylbenzoxazole, methyl-p-toluene sulphonate, acetic anhydride and N-ethyl rhodanic acid, as dark blue crystals with a gold reflex melting at 257° C. with decomposition.

A similar compound was obtained by the same method from glutaconic acid and the condensation product obtained according to method 1a from 1-methylbenzoxazole methiodide, N-methyl rhodanic acid and acetic anhydride as orange needles with a green reflex, melting at above 300° C.

*Example III*

7.3 gms. of condensation product obtained according to method 1a from 1-methylbenzthiazole, methyl-p-toluene sulphonate, acetic anhydride and N-methyl-rhodanic acid were fused with 30 gms. of methyl-p-toluene sulphonate for about 4 hours at about 140° C. The mixture was allowed to cool and 1.3 gms. of hydrazine hydrochloride and 150 ccs. of pyridine were added and the mixture was boiled gently under a reflux condenser for about half an hour. The dyestuff separated out and was filtered off from the mother liquors and repeatedly boiled with 50 cc. lots of benzene to purify it. The residue was obtained as a dark brown minutely crystalline powder.

*Example IV*

7.3 gms. of the condensation product obtained according to method 1a from 1-methylbenzthiazole, methyl-p-toluene sulphonate, acetic anhydride and N-methyl rhodanic acid were fused together with 30 gms. of ethyl-p-toluene sulphonate for 4 hours at about 140°–150° C. The mixture was then allowed to cool and 3.0 gms. of thiohydantoin and 150 ccs. of pyridine were added and the mixture was gently boiled under a reflux condenser for about 20 minutes. The mixture was then poured into a beaker and allowed to cool when the dye separated out. It was filtered off, washed with water, alcohol and ether and was boiled twice with 25 ccs. of methyl alcohol. The residue was obtained as dark blue crystals melting at 275° C. and decomposition at about 300° C.

A similar compound was obtained by the same method from thiohydantoin and the condensation product obtained according to the method 1a from quinaldine, methyl-p-toluene sulphonate and N-methyl rhodanic acid, as small black crystals melting above 306° C.

*Example V*

7.3 gms. of the condensation product obtained according to method 1a from 1-methylbenzthiazole, methyl-p-toluene sulphonate, acetic anhydride and N-methyl rhodanic acid were fused with 30 gms. of methyl-p-toluene sulphonate for 2½ hours at 130–140° C. The mixture was than allowed to cool and 3.7 gms. of N-methyl rhodanic acid and 150 ccs. of pyridine were added and the mixture was boiled for half an hour. The dyestuff which separated out was filtered off, washed with alcohol and then boiled with 50 ccs. of methyl alcohol and filtered while hot. The residual dye was obtained as a blue-grey powder, melting at over 300° C.

A similar reaction was carried out with N-methyl rhodanic acid and the methyl-p-toluene sulphonate of the condensation product obtained according to method 1a from 1-methylbenzoxazole methiodide and N-methyl rhodanic acid and acetic anhydride to yield brown matted crystals melting at over 300° C.

A similar reaction was carried out using N-ethyl rhodanic acid and the methyl-p-toluene sulphonate of the condensation product obtained according to method 1a from methylbenzoxazole, methyl-p-toluene sulphonate, N-ethyl rhodanic acid, and acetic anhydride.

A similar reaction was carried out with N-methyl rhodanic acid and the methyl-p-toluene sulphonate of the condensation product obtained according to method 1a from 1-methylbenzthiazole, methyl-p-toluene sulphonate, N-ethyl-rhodanic acid and acetic anhydride, to yield slate-blue matted needles, melting at 300° C.

*Example VI*

7.2 grams of the condensation product obtained according to method 1a from 1-methylbenzoxazole, methyl-p-toluene sulphonate, acetic anhydride and N-ethyl rhodanic acid, were fused with 30 grams of methyl-p-toluene sulphonate for four hours at 140° C. The mixture was allowed to cool and 4.5 grams of 1-phenyl-3-methyl-5-pyrazolone and 150 ccs. of pyridine were added and the whole was boiled gently under a reflux condenser for about 30 minutes. The mixture was then diluted with water when the dye precipitated out. This dye was separated off and washed with alcohol and then purified by boiling repeatedly with 30 cc. lots of methyl alcohol. The final residue was obtained as glittering green crystals melting at 264° C. The dyestuff is a sensitizer for photographic silver halide emulsions and extends the sensitivity of a silver iodobromide emulsion to about λ6300 Å. with maxima at about λ4700 Å. and λ5800 Å.

*Example VII*

7.3 grams of the condensation product obtained according to method 1a from 1-methylbenzthiazole, methyl-p-toluene sulphonate, acetic anhydride and N-methyl rhodanic acid were fused with 30 grams of methyl-p-toluene sulphonate for about 3 hours at 130–140° C. The mixture was allowed to cool and 150 ccs. of pyridine and 10 ccs. of cyclopentadiene were added and the mixture was heated on a water bath for about 30 minutes. The mixture was then poured into a beaker and allowed to stand when the dye separated out. This dye was filtered off, washed and extracted in a Soxhlet apparatus with benzene, and the final product obtained as a dark brown powder melting at 282° C.

A similar product was obtained by the same method from cyclopentadiene and the condensation product according to method 1a from 1-methyl-benzoxazole-methyltoluene sulphonate, acetic anhydride and N-methylrhodanic acid, as gold crystals, melting at 278° C. with decomposition.

A similar product was obtained by the same method from cyclopentadiene and the condensation product obtained according to method 1a from quinaldine, methyl-p-toluene sulphonate, acetic anhydride and N-methyl rhodanic acid, as golden crystals, melting at 260° C.

A similar product was obtained by the same method from cyclopentadiene and the condensation product obtained according to method 1a from 1-methylbenzthiazole, methyl-p-toluene sulphonate, acetic anhydride and N-ethyl rhodanic acid, as dark grey matted crystals melting at 285° C. with decomposition.

A similar product was obtained by the same method from cyclopentadiene and the condensation product obtained according to method 1a from 1-methylbenzoxazole, methyl-p-toluene sulphonate, acetic anhydride and N-ethyl rhodanic acid, as blue-brown crystals, melting at 280° C.

*Example VIII*

7.3 grams of the condensation product obtained according to method 1a from 1-methylbenzthiazole, methyl-p-toluene sulphonate, acetic anhydride and N-methyl rhodanic acid were fused with 30 grams of methyl-p-toluene sulphonate for two hours at 130° C. The mixture was then allowed to cool slightly and 10 ccs. of indene and 150 ccs. of pyridine were added and the whole was gently heated on a water bath for half an hour. The dyestuff which separated out was filtered off, and washed with alcohol and ether and extracted in a Soxhlet apparatus with benzene. The residual dyestuff was obtained as a dark blue powder, melting at over 280° C.

A similar reaction was carried out using the condensation product obtained according to method 1a from 1-methylbenzoxazole methiodide, N-methylrhodanic acid and acetic anhydride.

A similar reaction was carried out with the condensation product obtained according to method 1a from 1-methylbenzoxazole, ethyl-p-toluene sulphonate and N-methylrhodanic acid, to yield a dark green powder, melting at 268° C.

*Example IX*

0.77 gram of the condensation product obtained according to method 1a, from 1-methyl-benzthiazole, methyl-p-toluene sulphonate, acetic anhydride and N-ethyl rhodanic acid, were fused together with 0.38 gram of 1-amino-benzthiazole and 3 grams of ethyl-p-toluene sulphonate for four hours at 140–150° C. The mixture was then allowed to cool and 150 ccs. of pyridine were added after which the mixture was boiled gently under a reflux condenser for 20 minutes. The mixture was then poured into a solution of potassium iodide and allowed to stand. The crude dyestuff which separated out was collected and boiled out with benzene until the extracts were obtained colourless, when the residue was crystallised from 60 ccs. of methyl alcohol, leaving 0.03 gram of slate blue matted crystals, melting at 283° C. giving a blue-purple solution. This dyestuff is a sensitizer for silver halide photographic emulsions and extends the sensitivity of a silver iodobromide emulsion to about λ6900 Å. with indeterminate maxima at about λ6400 Å. and λ5600 Å. and a stronger maximum at about λ4700 Å.

*Example X*

0.73 gram of the condensation product obtained according to method 1a from 1-methyl benzthiazole methiodide, N-methyl rhodanic acid and acetic anhydride were fused together with 0.38 gram of 1-amino-benzthiazole and 3 grams ethyl-p-toluene sulphonate for four hours at 140–150° C. The mixture was then allowed to cool and 15 ccs. of pyridine were added, after which the mixture was gently boiled under a reflux condenser for 20 minutes. The mixture was then poured into a solution of potassium iodide and allowed to stand. The dyestuff which separated out was filtered off, washed with alcohol and benzene and extracted with benzene until the extracts were colourless. The residue was crystallised from 100 ccs. methyl alcohol yielding 0.15 gram small dark blue crystals melting at 284° C.

I claim:

1. A process for the production of dyestuffs which comprises condensing a five-membered heterocyclic nitrogen ring compound selected from the group characterized by one of the two following general formulae:

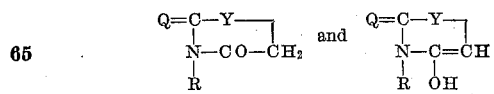

in which R is selected from the group consisting of alkyl, aryl and aralkyl groups, Q is an atom taken from the group consisting of sulphur and selenium, and Y is the residue of a five membered ring, in the presence of an anhydride of a monobasic carboxylic acid, and an acid binding agent, with a compound selected from the group consisting of quaternary salts of heterocyclic nitrogen compounds which have a nucleus of the type contained in cyanine dyes in which the quaternary nitrogen atom is a heterocyclic nitrogen atom and which contain a reactive methyl group in a position taken from the group consisting of the α and γ positions to the quaternary nitrogen atom, and reacting the dyestuff so formed with an alkyl salt and with a compound containing a group taken from the class consisting of reactive methyl and methylene groups.

2. A process for the production of dyestuffs which comprises condensing a five-membered heterocyclic nitrogen compound selected from the group characterized by one of the two following general formulae:

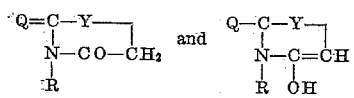

in which R is selected from the group consisting of alkyl, aryl and aralkyl groups, Q is an atom selected from the group consisting of sulphur and selenium, and Y is the residue of a five-membered ring, in the presence of an anhydride of a monobasic carboxylic organic acid and an acid binding agent, with a compound selected from the group consisting of quaternary salts of heterocyclic nitrogen compounds which have a nucleus of the type contained in cyanine dyes in which the quaternary nitrogen atom is a heterocyclic nitrogen atom and which contain a reactive methyl group in a position taken from the group consisting of the α and γ positions to the quaternary nitrogen atom, mixing the dyestuff so formed with an alkyl salt and a heterocyclic nitrogen compound containing a group taken from the class consisting of reactive methyl and methylene groups, the proportion of alkyl salt being more than sufficient theoretically to form salts from both the said dyestuff and the said heterocyclic nitrogen compound, fusing the mixture to effect reaction, adding a solvent and an acid binding agent and boiling to complete the reaction.

3. A process for the production of dyestuffs which comprises condensing a five-membered heterocyclic nitrogen compound selected from the group characterized by one of the two following general formulae:

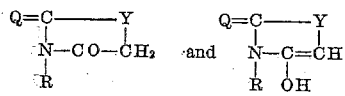

in which R is selected from the group consisting of alkyl, aryl and aralkyl groups, Q is an atom taken from the group consisting of sulphur and selenium and Y is the residue of a five-membered ring, in the presence of an anhydride of a monobasic organic carboxylic acid and an acid binding agent, with a compound selected from the group consisting of quaternary salts of heterocyclic nitrogen compounds which have a nucleus of the type contained in cyanine dyes in which the nitrogen atom is a heterocyclic nitrogen atom and which contain a reactive methyl group in a position taken from the group consisting of the α and γ positions to the quaternary nitrogen atom, reacting the dyestuff so formed with an alkyl salt to form an intermediate compound, and condensing the said intermediate compound with a compound containing a group taken from the class consisting of reactive methyl and methylene groups.

4. A process for the production of dyestuffs which comprises condensing an N-alkyl rhodanic acid, in the presence of an anhydride of a monobasic organic carboxylic acid and an acid binding agent, with a compound selected from the group consisting of quaternary salts of heterocyclic nitrogen compounds which have a nucleus of the type contained in cyanine dyes in which the quaternary nitrogen atom is a heterocyclic nitrogen atom and which contain a reactive methyl group in a position taken from the group consisting of the α and γ positions to the quaternary nitrogen atom, mixing the dyestuff so formed with a compound selected from the class consisting of heterocyclic nitrogen compounds which have a nucleus of the type contained in cyanine dyes and which contain a reactive methyl group in a position taken from the group consisting of the α and γ positions to the nitrogen atom and with a quantity of alkyl-p-toluene sulphonate more than sufficient theoretically to form salts from both the dyestuff and the heterocyclic nitrogen compound, fusing the mixture together to effect reaction, adding a solvent and an acid binding agent and boiling to complete the reaction.

5. The process of claim 4 wherein pyridine is employed in the last step both as a solvent and an acid binding agent.

6. The process of claim 3 wherein acetic anhydride is employed as the anhydride of a monobasic organic acid.

7. The process of claim 4 wherein acetic anhydride is employed as the anhydride of a monobasic organic acid.

8. A process for the production of dyestuffs which comprises condensing a five-membered heterocyclic nitrogen compound selected from the group characterized by one of the two following general formulae:

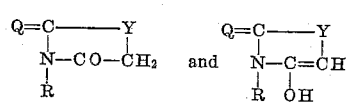

in which R is selected from the group consisting of alkyl, aryl and aralkyl groups, Q is an atom taken from the group consisting of sulphur and selenium, and Y is the residue of a five-membered ring, in the presence of an anhydride of a monobasic organic carboxylic acid and an acid binding agent, with a compound selected from the group consisting of quaternary salts of heterocyclic nitrogen compounds which have a nucleus of the type contained in cyanine dyes in which the quaternary nitrogen atom is a heterocyclic nitrogen atom and which contain a reactive methyl group in a position taken from the group consisting of the α and γ position to the quaternary nitrogen atom, reacting the dyestuff so formed with an alkyl salt to form an intermediate compound and condensing said intermediate compound with malonic acid in the presence of pyridine.

9. The process of claim 8 wherein an alkyl-p-toluene sulphonate is employed to form the intermediate compound.

10. A process for the production of a dye comprising condensing 1-methylbenzthiazole methyl-p-toluene sulphonate with N-methyl rhodanic acid in the presence of acetic anhydride and pyridine and then reacting the condensation product with 1-methylbenzthiazole and ethyl-p-toluene sulphonate.

11. A process for the production of dyestuffs comprising treating with an alkyl salt a compound of the general formula:

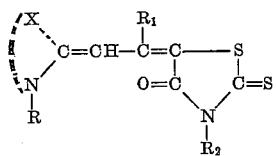

where X is the remainder of a heterocyclic system of the type used in cyanine dyes, R is alkyl, $R_1$ is alkyl, and $R_2$ is a member of the group consisting of alkyl, aryl and aralkyl.

12. A process for the production of dyestuffs comprising treating with an alkyl salt a compound of the general formula:

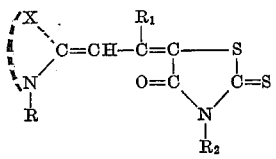

where X is the remainder of a heterocyclic system of the type used in cyanine dyes, R is alkyl, $R_1$ is alkyl, and $R_2$ is a member of the group consisting of alkyl, aryl, and aralkyl and condensing the intermediate so formed in the presence of an acid binding agent with a compound selected from the class of heterocyclic nitrogen compounds which have a nucleus of the type contained in cyanine dyes and which contain a reactive methyl group in a position taken from the group consisting of the $\alpha$ and $\gamma$ positions to the ring nitrogen atom.

13. A product of the general formula:

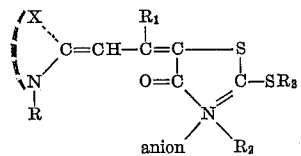

where X is the remainder of a heterocyclic system of the type used in cyanine dyes, R, $R_1$ and $R_3$ are alkyl, and $R_2$ is a member of the group consisting of alkyl, aryl, and aralkyl.

14. A product of the general formula:

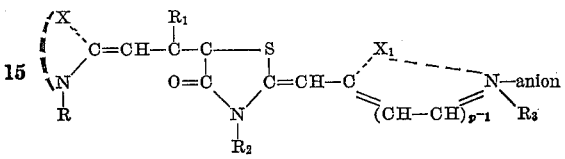

where X and $X_1$ are the remainders of the heterocyclic systems of the type used in cyanine dyes, $p$ is a positive integer less than 3, R, $R_1$ and $R_3$ are alkyl groups, and $R_2$ is a member of the group consisting of alkyl, aryl, and aralkyl.

JOHN DAVID KENDALL.

REFERENCES CITED

The following references are of record in the file of this patent:

UNITED STATES PATENTS

| Number | Name | Date |
|---|---|---|
| 2,078,233 | Brooker | Apr. 27, 1937 |

FOREIGN PATENTS

| Number | Country | Date |
|---|---|---|
| 808,598 | France | 1936 |